United States Patent [19]

Mitani et al.

[11] Patent Number: 5,296,922
[45] Date of Patent: Mar. 22, 1994

[54] PROJECTION TELEVISION WITH A WAVELENGTH-SELECTION-TYPE REAR PROJECTION SCREEN

[75] Inventors: Katsuaki Mitani; Noboru Yasumatsuya; Yoshiki Tsujita, all of Osaka, Japan

[73] Assignee: Matsushita Electric Industrial Co., Ltd., Osaka, Japan

[21] Appl. No.: 852,980

[22] Filed: Mar. 17, 1992

[30] Foreign Application Priority Data

Apr. 4, 1991 [JP] Japan .................................. 3-071517

[51] Int. Cl.$^5$ .......................... H04N 5/72; H04N 9/31; H04N 5/74
[52] U.S. Cl. .................................. 348/779; 348/381; 313/112; 359/457; 359/460
[58] Field of Search .................. 358/56, 60, 29, 61, 358/253, 250, 252, 55, 231; 359/443, 450, 453, 454, 455, 456, 457, 460, 452, 885; 313/112, 474, 478; H04N 5/72, 9/16, 9/31, 5/74

[56] References Cited

U.S. PATENT DOCUMENTS

| | | | |
|---|---|---|---|
| 3,679,451 | 7/1972 | Marks et al. | 359/453 |
| 4,003,080 | 1/1977 | Maiman et al. | 358/87 |
| 5,066,099 | 11/1991 | Yoshida et al. | 359/457 |
| 5,168,351 | 12/1992 | Bradley et al. | 358/60 |

FOREIGN PATENT DOCUMENTS

| | | | |
|---|---|---|---|
| 58-072935 | 5/1983 | Japan | 358/60 |
| 59-214837 | 12/1984 | Japan | H04N 5/74 |
| 63-49539 | 4/1988 | Japan | H04N 5/74 |
| 2-145073 | 6/1990 | Japan | H04N 5/74 |
| 2-189538 | 7/1990 | Japan | H04N 5/74 |
| 3-10588 | 1/1991 | Japan | H04N 3/74 |
| 3-53236 | 3/1991 | Japan | H04N 5/74 |
| 9013906 | 11/1990 | World Int. Prop. O. | H04N 5/720 |

Primary Examiner—James J. Groody
Assistant Examiner—Safet Metjahic
Attorney, Agent, or Firm—Pollock, Vande Sande & Priddy

[57] ABSTRACT

A projection television has a rear projection screen including a Fresnel lens and a lenticular lens, and a smoke sheet. The screen is characterized in that a dye or a pigment is mixed into the lenticular lens sheet or the smoke sheet which thereby has a waveform selection transmittance having the following transmittance values:

$\geq 65\%$ when incident light wavelength is $<490$ nm.
$\leq 60\%$ when incident light wavelength is 490 nm–660 nm.

wherein the transmittance, for incident light wavelength 490 nm–580 nm., is substantially different from the transmittance when the wavelength is 580 nm.–660 nm.

5 Claims, 9 Drawing Sheets

R : RED
G : GREEN
B : BLUE

FIG. 11

| ITEMS / CASES | | CONVENTIONAL SCREEN (34) | | CONVENTIONAL SCREEN (35) | | FIRST EMBODIMENT (36) | |
|---|---|---|---|---|---|---|---|
| COLOR TEMP CORRES TO OVERALL WHITE (°K) | | 8,970 | | 8,990 | | 9,020 | |
| BEAM-CURRENT RATIO | RED CRT | (mA) 0.32 | (%) 18 | (mA) 0.31 | (%) 18 | (mA) 0.38 | (%) 22 |
| | GREEN CRT | 0.40 | 24 | 0.41 | 24 | 0.47 | 27 |
| | BLUE CRT | 1.00 | 58 | 1.00 | 58 | 0.87 | 51 |
| | TOTAL | 1.72 | 100 | 1.72 | 100 | 1.72 | 100 |
| LUMINANCE | RED | (nit) 42.0 | (%) 20 | (nit) 29.6 | (%) 20 | (nit) 33.4 | (%) 20 |
| | GREEN | 147.0 | 70 | 104.0 | 70 | 117.0 | 70 |
| | BLUE | 21.0 | 10 | 14.8 | 10 | 16.7 | 10 |
| | OVERALL WHITE | 210.0 | 100 | 148.4 | 100 | 167.1 | 100 |
| | EFFECTS | SUPPOSED AS 100 % | | DECREASED BY 30 % | | DECREASED BY 20 % | |
| "EXTERNAL-LIGHT" CONTRAST RATIO | LUMINANCE ON SCREEN: 200Lux | 1 : 22.4 | | 1 : 28.9 | | 1 : 30.3 | |
| | EFFECTS | SUPPOSED AS 1 | | 1.29 | | 1.35 | |

TEMP : TEMPERATURE
CORRES : CORRESPONDING

PROJECTION TELEVISION WITH A WAVELENGTH-SELECTION-TYPE REAR PROJECTION SCREEN

BACKGROUND OF THE INVENTION

1. Field of the Invention

This invention relates to a projection television (hereunder abbreviated as TV) in which an image formed on the screen of each of three cathode ray tubes, (hereunder abbreviated as CRTs) respectively corresponding to red, green and blue colors (hereunder referred to as red, green and blue CRTs, respectively) is magnified and projected therefrom on a rear projection screen (i.e., a large screen).

2. Description of the Related Art

FIG. 9 illustrates a conventional projection TV in which images formed on the screens of red, green and blue CRTs 1, 2 and 3 are respectively magnified by a lens 4 corresponding to red light, a lens 5 corresponding to green light and a lens 6 corresponding to blue light and are projected on a conventional two-sheet rear projection screen 34 which is a combination of two lens sheets, namely, a Fresnel lens sheet 7 and a lenticular lens sheet 8 as shown in FIG. 10.

Further, as illustrated in FIG. 10, black stripes 10 are provided on the surface, from which no light is utilized, of the lenticular lens sheet 8 of the conventional rear projection screen 34 as a countermeasure to prevent a deterioration of contrast measured under presence of external light irradiated thereon (hereunder sometimes referred to simply as "external-light contrast" or as "external-light contrast" ratio), which is caused due to reflection of external light thereon. The conventional rear projection screen 34, however, has a defect in that sufficient contrast cannot be obtained due to reflection of external light caused by a lens surface 11 of the lenticular lens sheet 8 or by an inner light-diffusing material of the sheet 8.

Thus, for the purpose of improving contrast, a further conventional rear projection screen has been developed, in which dye or pigment is added to the lenticular lens sheet 8. Further, there has been developed another conventional rear projection screen 35 wherein a lens sheet 9, into which dye or pigment is mixed (incidentally, such a lens sheet is referred to simply as a smoke sheet in the instant application), is provided in front of the lenticular lens sheet 8 as illustrated in FIG. 9, with the aim of decreasing reflection of external light and improving contrast. Such an improved conventional rear projection screen 35, however, has a drawback in that the optical transmittance (i.e., the screen gain) thereof decreases.

Results of measurement of performance (e.g., transmittance) of the conventional rear projection screens are shown in FIG. 11. As is seen from this figure, the transmittance of the conventional three-sheet screen 35 provided with the smoke sheet 9 having substantially uniform transmittance (e.g., 70%) in addition to the Fresnel and lenticular lens sheets is smaller than that of the conventional two-sheet rear projection screen 34 by 30%. Conversely, the "external-light contrast" of the screen 35 is greater than that of the screen 34 by 29%. The luminance of the screen 35, however, is 70.7% of that of the screen 34 (namely, is less than that of the screen 34 by 29.3%). Thus, there occurs a deterioration in luminance as indicated by a bar B of FIG. 7. As is apparent from the foregoing results, in the case of the conventional screen provided with not only the Fresnel and lenticular lens sheets but the smoke sheet, of which the transmittance is nearly uniform in the case where incident rays are visible ones, there inevitably occurs a deterioration in luminance in spite of increase in "external-light contrast".

A method for increasing CRT power has been proposed as a countermeasure to compensate the deterioration in luminance, which is caused by employing the smoke sheet in addition to the Fresnel and lenticular lens sheets. The transmittance of the smoke sheet 9, however, is nearly uniform in case that the wavelength of light impinging thereon is of visible region. It is, therefore, necessary for establishing the same color temperature (i.e., 9000° K. corresponding to white) as of the conventional two-sheet screen 34 to increase beam currents respectively applied to the CRTs 1, 2 and 3 while a ratio of the magnitude of the beam current flowing through each of the red, green and blue CRTs to the total magnitude of the sum of the beam currents (hereunder referred to simply as a beam-current ratio) is maintained as in the case of employing the screen 34, which is indicated by a bar E of FIG. 8.

If a beam current, which is equal to a maximum current rating, flows through the blue CRT, the luminance of the blue CRT cannot be increased any more (incidentally, the beam-current ratios in the case of employing the conventional screen 34 is indicated by a bar D of FIG. 8).

Further, in the case where the conventional screen 35 is used, even if the beam current flowing through each of the red and green CRTs is less than or equal to a corresponding maximum current rating, the beam current flowing through each of the red and green CRTs cannot be increased if the beam current, which is equal to the maximum current rating, flows through the blue CRT. Thus, increase in luminance is not possible. Namely, the conventional screen 35 has a defect in that when the "external-light contrast" is increased, luminance decreases. The present invention is created to eliminate the defect of the conventional screen.

It is, accordingly, an object of the present invention to provide a projection TV which employs a wavelength-selection-type screen, the transmittance of which varies with the wavelength of light impinging thereon, and utilizes power of each CRT thereby minimizing the decrease in luminance when the "external-light contrast" is increased.

SUMMARY OF THE INVENTION

The screen of the present invention is characterized in that a dye or a pigment is mixed into the lenticular lens sheet or the smoke sheet which thereby has a waveform selection transmittance having the following transmittance values:

$\geqq 65\%$ when incident light wavelength is $<490$ nm.
$\leqq 60\%$ when incident light wavelength is 490 nm–660 nm.

wherein the transmittance, for incident light wavelength 490 nm–580 nm., is substantially different from the transmittance when the wavelength is 580 nm.–660 nm.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 11 is a diagram for comparing objected values of the beam-current ratios, the luminance and the "external-light contrast" ratios of the first embodiment and the conventional screens.

DETAILED DESCRIPTION OF THE PREFERRED EMBODIMENTS

Hereinafter, preferred embodiments of the present invention will be described in detail by referring to the accompanying drawings.

Figure 1:
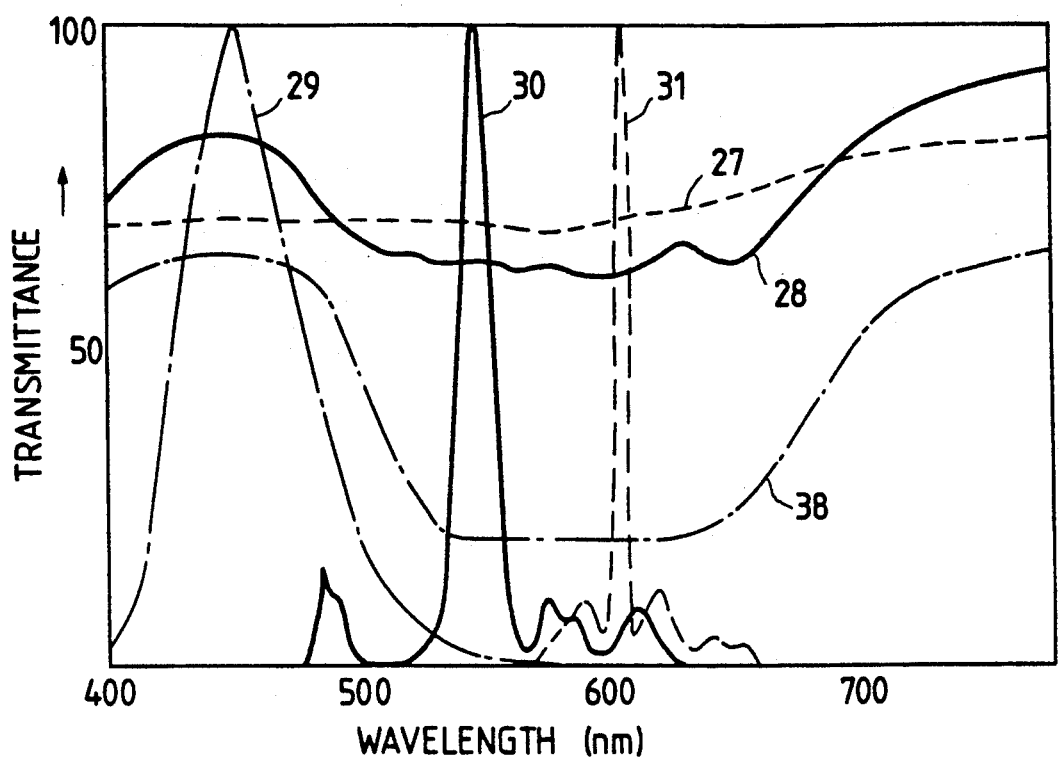
FIG. 1 is a graph showing the wavelength selection characteristics (namely, the relation between the transmittance and the wavelength of incident light) of a first embodiment of the present invention as well as those of a conventional screen.
Figure 3:
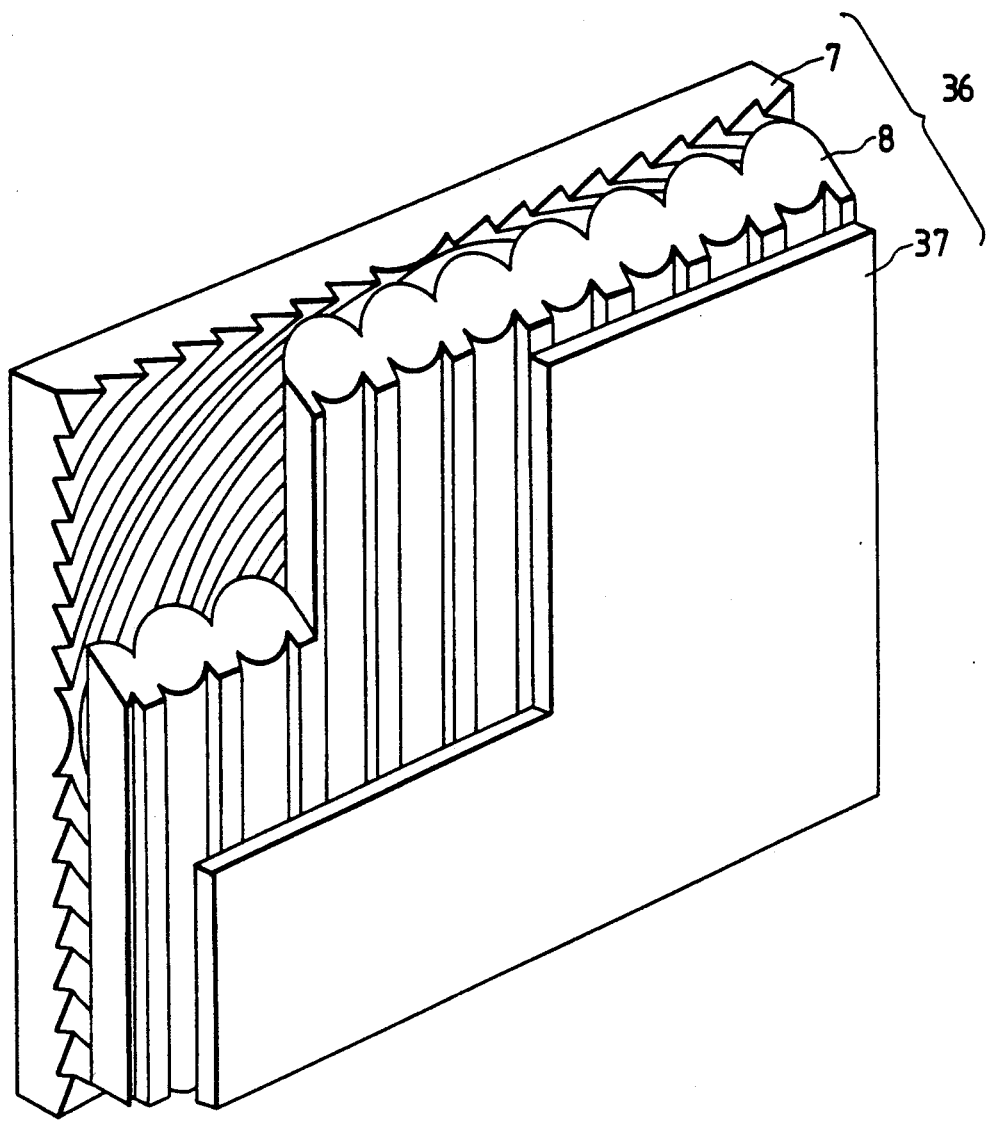
FIG. 3 is a partial-cutaway perspective diagram illustrating the configuration of a screen employing a wavelength-selection-type sheet of the present invention.

A first projection TV (namely, a first embodiment) of the present invention employs a wavelength-selection-type smoke sheet, the transmittance of which is large in case where the wavelength of incident light is less than 490 nano-meters (nm), but the transmittance of which is small in the case where the wavelength of incident light is of from 490 nm to 660 nm as indicated by a curve 28 of FIG. 1. (Incidentally, in FIG. 1, the longitudinal axis indicates the (relative) transmittance represented by letting that of a conventional rear projection screen be 100%.) Namely, a three-sheet rear projection screen 36 of FIG. 3 is formed by including a smoke sheet 37, which contains dye or pigment at a predetermined percentage so as to have wavelength selectivity, instead of the smoke sheet 9 having a uniform transmittance. Thus the beam currents of the red and green CRTs are increased.

Generally, transmittance characteristics of color phosphors formed on panel portions of the blue, green and red CRTs of a projection TV are as illustrated in FIG. 1. The blue CRT has an emission spectrum 29, the main peak of which is in the vicinity of 450 nm. Further, the green CRT has an emission spectrum 30, the main peak of which is in the neighborhood of 550 nm. Moreover, the red CRT has an emission spectrum 31, the main peak of which is in the vicinity of 610 nm.

The wavelength-selection-type smoke sheet 37 of FIG. 3 according to the present invention has a wavelength selection transmittance as indicated by a curve 28 of FIG. 1. Namely, the transmittance of the smoke sheet 37 exceeds 80% when the wavelength of incident light is in the range of wavelength corresponding to the emission spectrum 29 of the blue CRT. However, the transmittance of the smoke sheet 37 becomes of from 60% to 65% when the wavelength of incident light is in the ranges of wavelength corresponding to the emission spectrum 30 of the green CRT and corresponding to the emission spectrum 31 of the red CRT. Thus, an average transmittance of the smoke sheet 37 is 70% or so. Hereinafter, the wavelength-selection-type smoke sheet 37 will be described by comparing it with the conventional smoke sheet 27 having a uniform transmittance.

Figure 5:
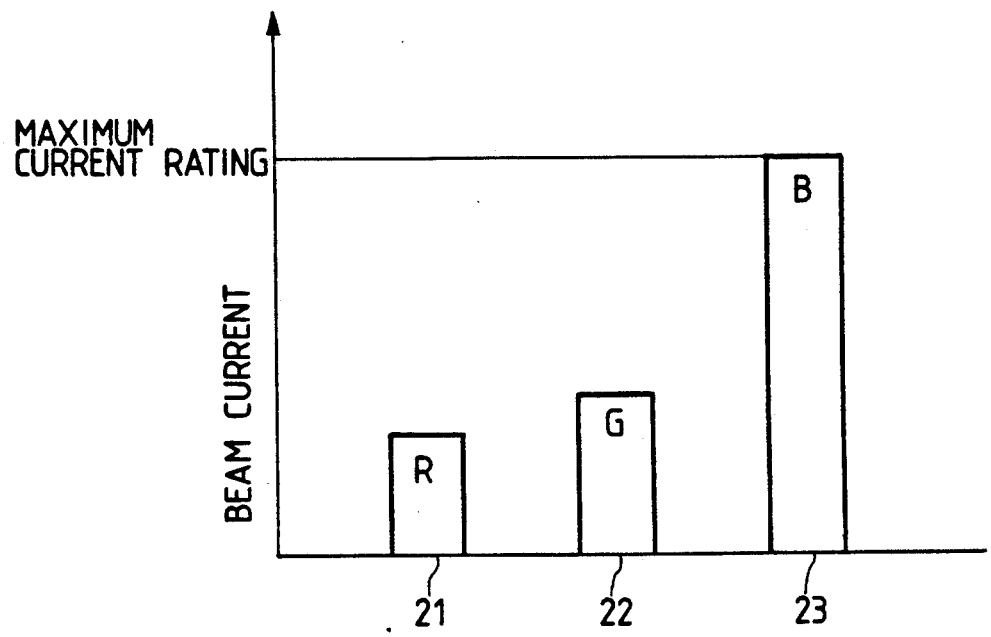
FIG. 5 is a bar chart showing the beam-current ratio of each of the red, green and blue CRTs in the case of employing a smoke sheet which has a uniform transmittance.
Figure 6:
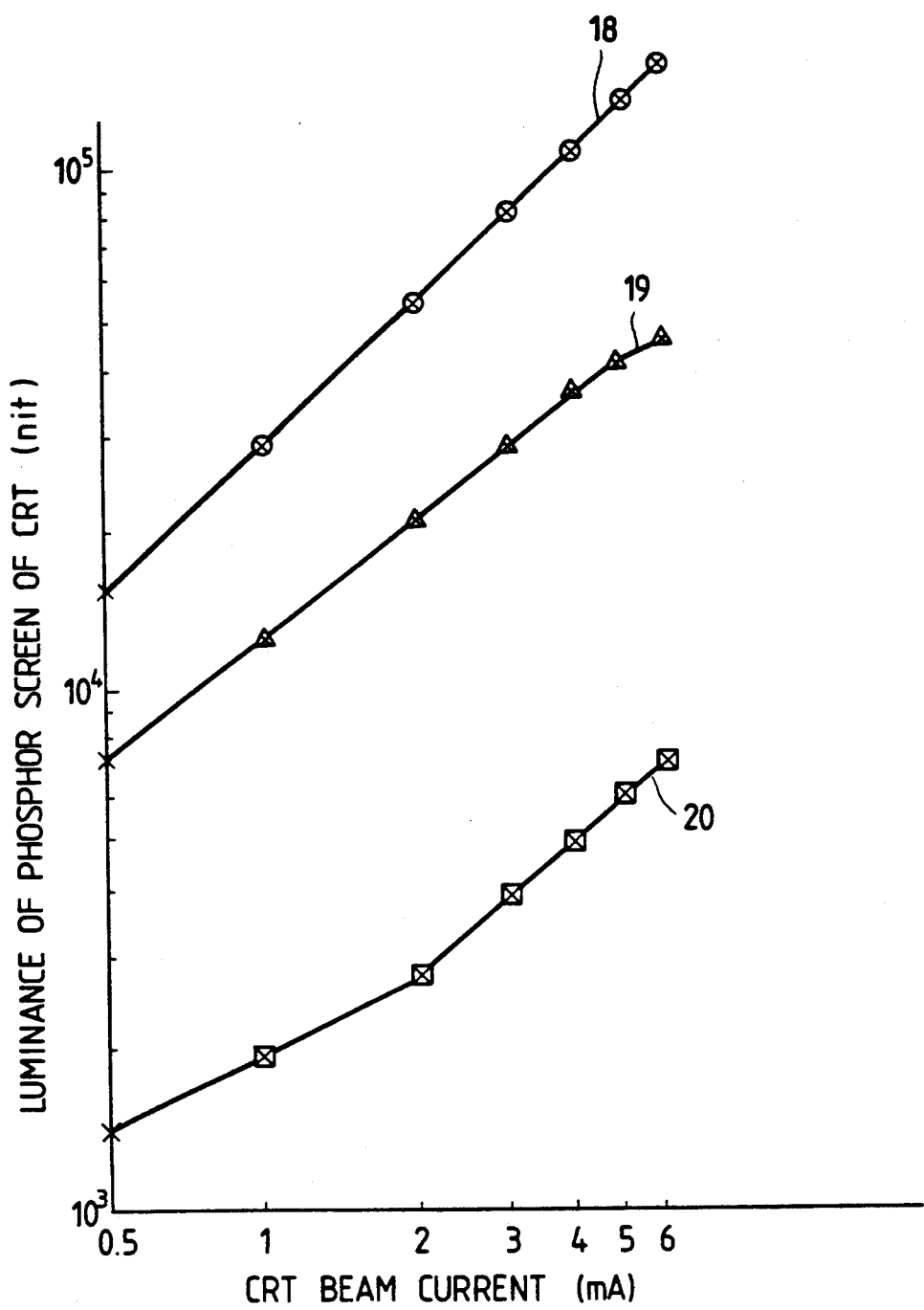
FIG. 6 is a graph illustrating the relation between the luminance presented on the phosphor screen and the beam current of each of the red, green and blue CRTs.
Figure 7:
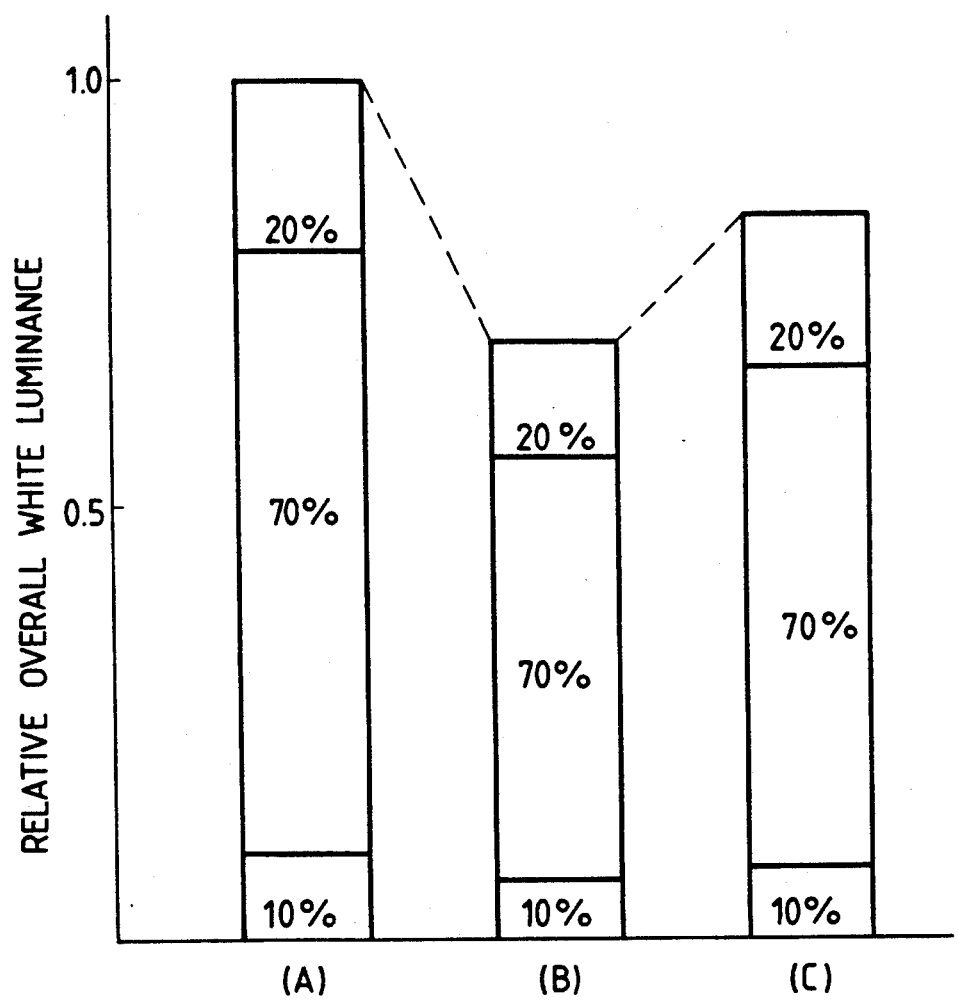
FIG. 7 is a bar chart for illustrating effects of improving luminance efficiency (i.e., effects of reducing a deterioration of luminance) in the case of the projection TV of the present invention.

In the case where white corresponding to a certain color temperature (e.g., 9000° K.) is established on the surface of the conventional projection screen, the proportion or ratio of luminance (hereunder referred to simply as the luminance ratio), which is nearly equal to that indicated in a bar A of FIG. 7, of each of red, green and blue light to luminance of white light produced by combining the red, green and blue light becomes necessary. The luminance ratios observed on the surface on the screen is substantially the same as those observed on the surface of the phosphor screen of the cathode ray tube and is, therefore, derived from the relation of FIG. 6 between the magnitude of the beam current of each of the CRTs and the corresponding luminance observed on the phosphor surface thereof, which is measured under predetermined conditions (namely, a high voltage is 32 kilo-volts (kV); a cathode voltage 180 V; and a focus level JUST). If the maximum current ratings of the three CRTs are substantially equal to one another, the maximum luminance is obtained in the case where the beam current 23 of the blue CRT is equal to the maximum current rating thereof as illustrated in FIG. 5. If the beam current 21 of the red CRT and that 22 of the green CRT are regulated in this state in such a manner to establish the white corresponding to the color temperature (i.e., 9000° K.), the beam-current ratios should be as indicated in a bar D of FIG. 8. The reason why the magnitude of the beam current of the blue CRT is larger than those of the beam currents of the red and green CRTs is that the luminance 20 observed on the phosphor screen of the blue CRT is lower than that 18 observed on the phosphor screen of the green CRT and that 19 observed on the phosphor screen of the red CRT (namely, efficiency (hereunder referred to as emission efficiency) in emitting light from the phosphor screen of the blue CRT is less than emission efficiency of the green or red CRT) as illustrated in FIG. 6.

Figure 8:
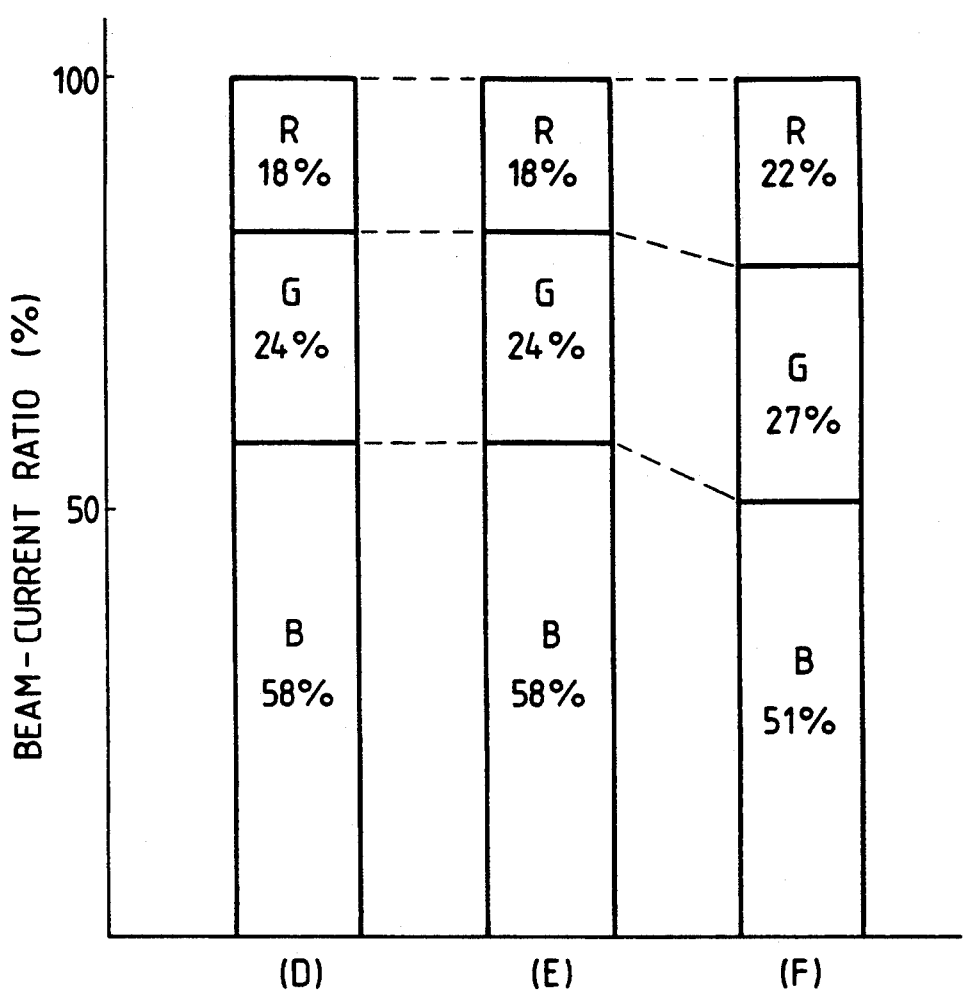
FIG. 8 is a bar chart for illustrating differences in beam-current ratios among the conventional screens and the screen of the present invention.
Figure 9:
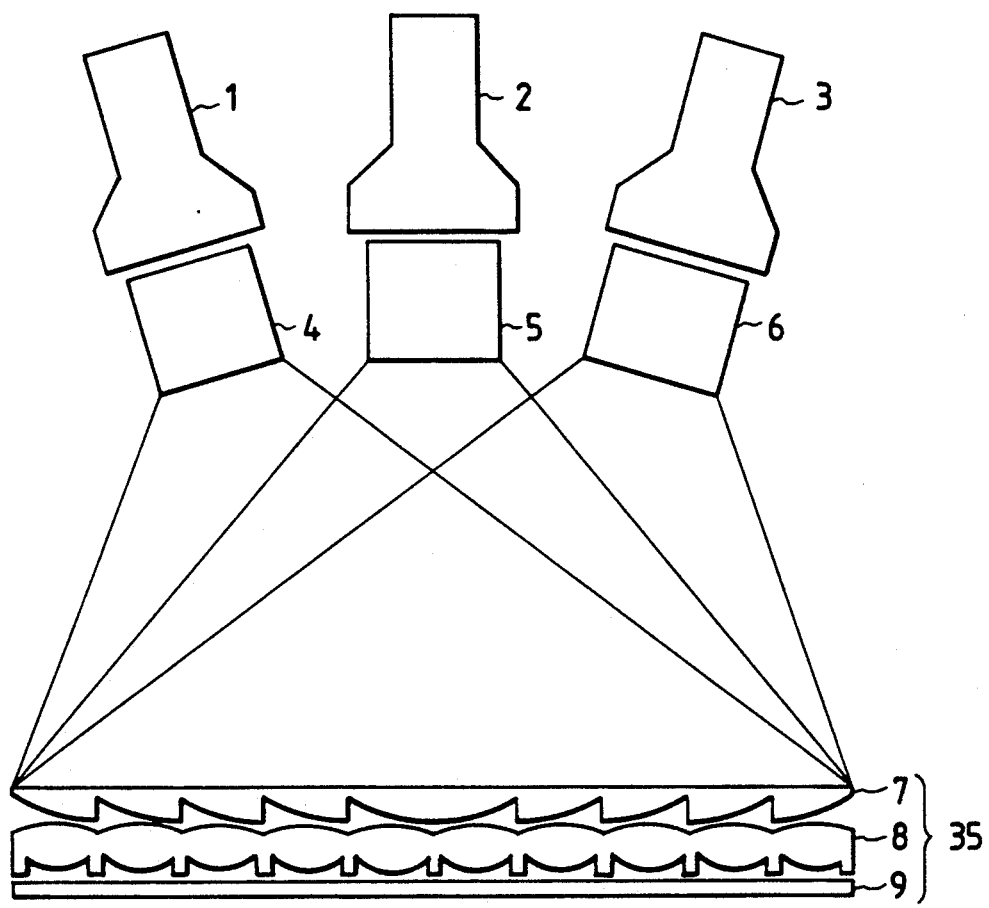
FIG. 9 is a sectional view of a combination of optical systems and a conventional screen, which employs a smoke sheet having a uniform transmittance, of a projection TV.
Figure 10:
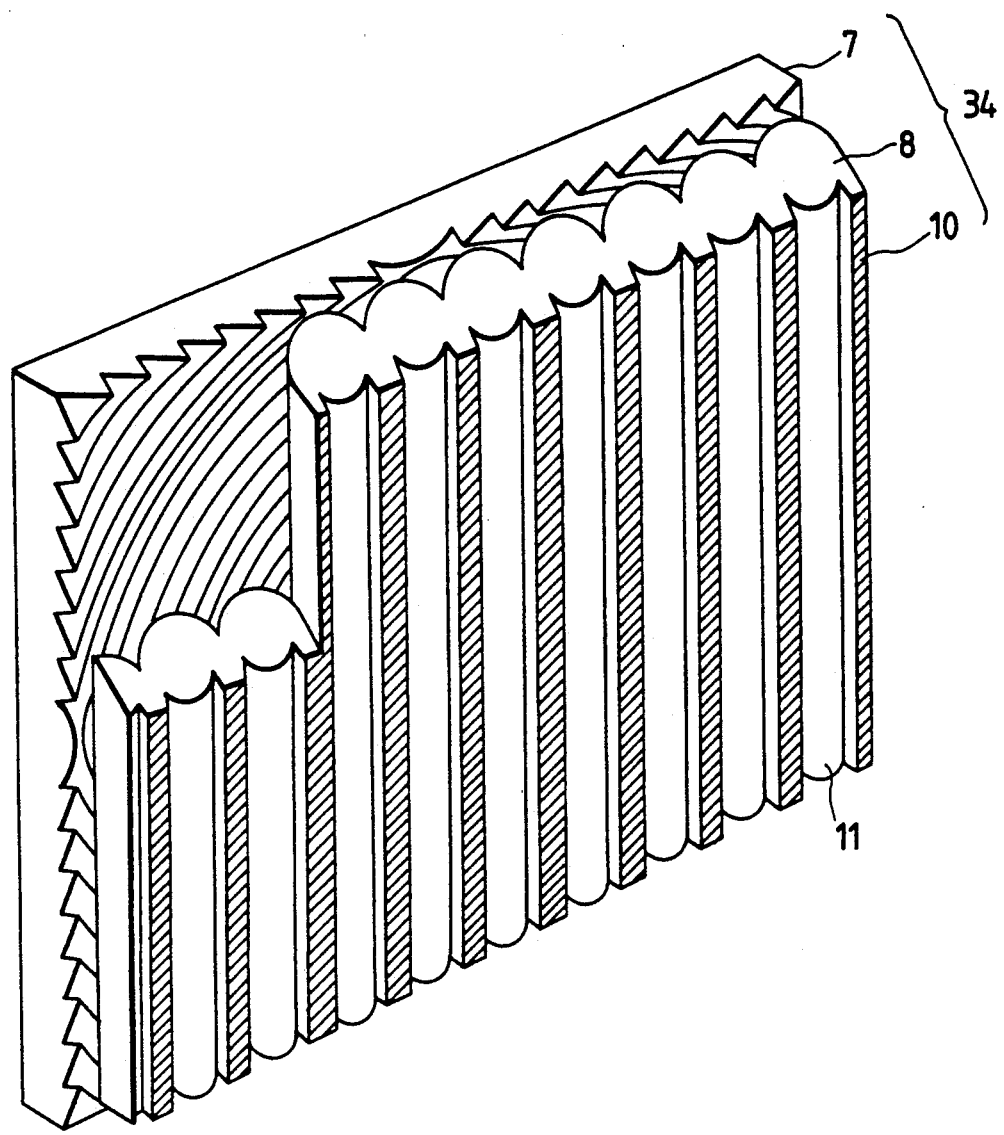
FIG. 10 is a perspective diagram showing the configuration of a conventional screen.

In the case where a smoke sheet 27, the transmittance of which is uniform (e.g., 70%) when visible rays are incident thereon, is employed under such conditions in order to improve the "external-light contrast", the beam-current ratios become as indicated in a bar E of FIG. 8 if the white corresponding to the same color temperature (i.e., 9000° K.) is established. Namely, the beam-current ratios are unchanged. Further, the ratios of luminances observed on the screens of the red, green and blue CRTs become as indicated by the bar B of FIG. 7. Thus, although the ratios of the luminances of red, green and blue light are unchanged, the luminance (hereunder referred to simply as the relative overall white luminance) of white light produced by combining the red, green and blue light with one another decreases.

Figure 4:
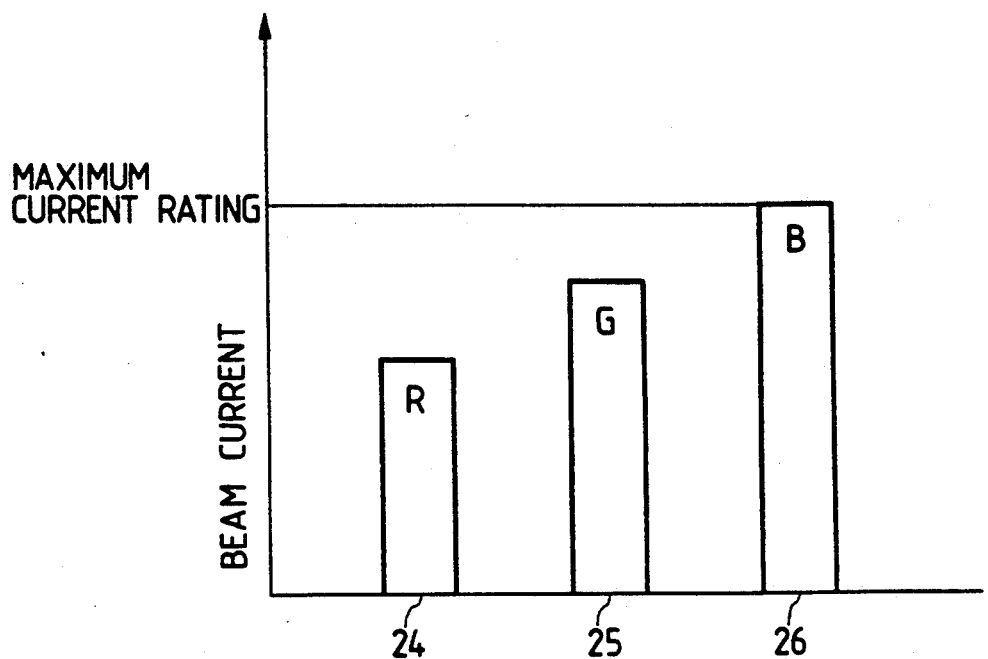
FIG. 4 is a bar chart showing the beam-current ratio of each of the red, green and blue CRTs of the first embodiment of the present invention.

In the case of this embodiment, the transmittance is relatively large in the vicinity of the wavelength of 450 nm, which is within the range of wavelength corresponding to the emission spectrum 29 of the blue CRT as illustrated in FIG. 1. In contrast, at wavelengths of the ranges corresponding to the emission spectrum 30 of the red CRT and to the emission spectrum 30 of the green CRT, the transmittance is relatively small. Hence, when supplying a beam current, which is equal to the corresponding maximum current rating, to the blue CRT, the color temperature becomes higher than 9000° K. if conventional power distribution of FIG. 5 is employed. Therefore, in order to adjust the color temperature to 9000° K., beam currents, of which the magnitudes are greater than those fed in the conventional case as the beam current 24 of the red CRT and that 25 of the green CRT 25, should be supplied to such CRTs so long as the beam current, which is equal to the maximum current rating and flows through the blue CRT as indicated by reference character 26 of FIG. 4, is maintained.

At that time, the beam-current ratio of each of the red, green and red CRTs becomes as indicated in a bar F of FIG. 8. In comparison with the beam-current ratios of a conventional case as indicated by the bar E, the beam-current ratios of the red and green CRTs become higher but the beam-current ratio of the blue CRT becomes lower.

As is seen from a bar C of FIG. 7, the beam-current ratios become the same as those of the conventional case indicated by the bar B by increasing the beam-current ratios of the red and green CRTs in this way. Thus, the luminances of the red and green CRTs which have high emission efficiency are increased but the relative overall white luminance becomes larger than that indicated by the bar B. Further, the "external-light contrast" ratio of this embodiment becomes as indicated in FIG. 11. (Incidentally, the "external-light contrast" ratio of this embodiment may considerably vary with the intensity or magnitude of external light and its environment or surroundings. Therefore, the "external-light contrast" ratio is measured under the same environment by maintaining the illuminance of 200 luxes on the surface of the screen.) Further, FIG. 11 is a diagram for comparing observed values of the beam-current ratios, the luminance and the "external-light contrast" ratios of this embodiment, the improved conventional screen 35 and the conventional screen 34 which is employed as a standard or reference for the comparison. As is seen from FIG. 11, the "external-light contrast" ratio of the screen 36 including the waveform-selection-type sheet according to the present invention becomes larger than that of the conventional screen 34 by 35%. At that time, the relative overall white luminance of the screen 36 becomes less than that of the screen 34 by only 20%. Practically, this is a favourable result.

Incidentally, in the first embodiment, the transmittance of the smoke sheet exceeds 80% when the wavelength of incident light is in the range of wavelength corresponding to the emission spectrum of the blue CRT. Further, the transmittance of the smoke sheet becomes 60 to 65% when the wavelength of incident light is in the ranges of wavelength corresponding to the emission spectrum of the green CRT and corresponding to the emission spectrum of the red CRT. It is apparent that in the case where the "external-light contrast" ratio should be further increased, a desired "external-light contrast" ratio can be obtained by controlling the transmittance of the smoke sheet in such a manner that the transmittance of the smoke sheet becomes equal to or greater than 65% when the wavelength of incident light is within the range of wavelength corresponding to the emission spectrum of the blue CRT. Also, that the transmittance of the smoke sheet becomes from 20 to 65% when the wavelength of incident light is in the ranges of wavelength corresponding to the emission spectrum of the green CRT and corresponding to the emission spectrum of the red CRT as illustrated by a curve 38 of FIG. 1.

Additionally, it is also apparent that in such a case, the luminance varies with the transmittance.

Figure 2:
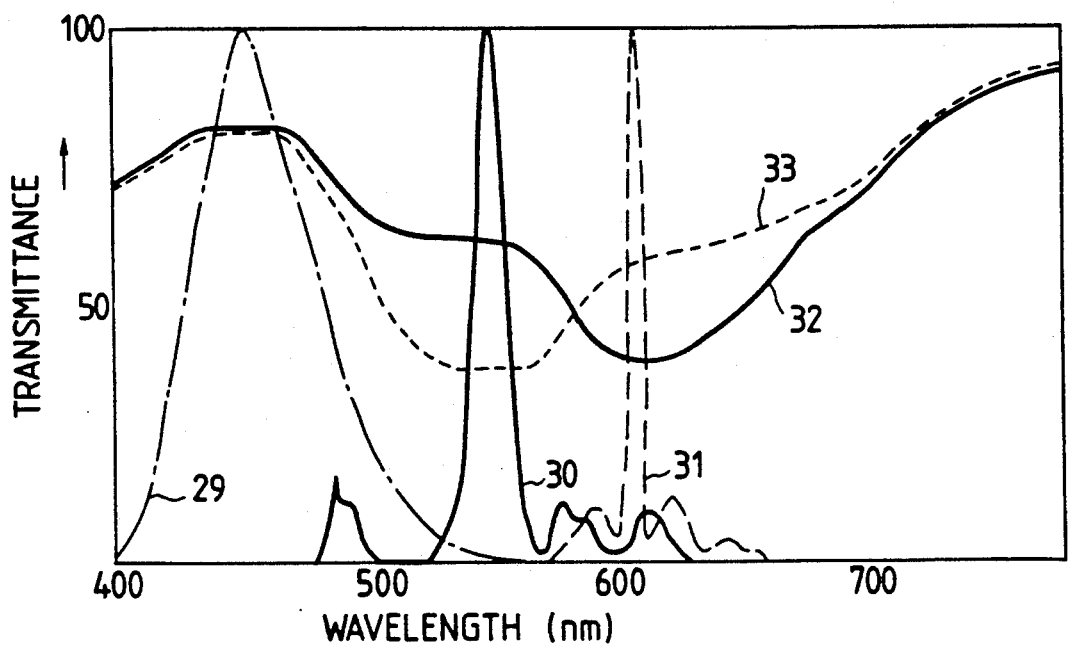
FIG. 2 is a graph showing the wavelength selection characteristics of second and third embodiments of the present invention.

Hereinafter, a second embodiment of the present invention will be described by referring to a curve 32 of FIG. 2. (Incidentally, in FIG. 2, the longitudinal axis indicates the (relative) transmittance represented by letting that of a conventional rear projection screen be 100%.) Apparently, the second embodiment provided with a waveform selection sheet having a transmittance (hereunder referred to as a waveform selection transmittance), which changes according to the wavelength of incident light and is as indicated by the curve 32, can have substantially the same effects as the first embodiment does.

Similarly, as in case of the first embodiment, power distribution to the green CRT is increased.

Thus the second embodiment can increase the "external-light contrast" and compensate the reduction in luminance on the screen thereof by employing a three-sheet projection screen, in which the waveform selection smoke sheet is provided in addition to the conventional Fresnel and lenticular lens sheets.

Incidentally, by mixing a material (e.g., dye or pigment) into the lenticular lens sheet 8 of the conventional two-sheet projection screen so as to have a waveform selection transmittance (namely, by employing such a waveform-selection-type lenticular lens sheet instead of using the waveform selection sheet, substantially the same effects as of the above described embodiments can be obtained.

While preferred embodiments of the present invention have been described above, it is to be understood that the present invention is not limited thereto and that other modifications will be apparent to those skilled in the art without departing from the spirit of the invention.

The scope of the present invention, therefore, is to be determined solely by the appended claims.

What is claimed is:

1. A projection television having a rear projection screen including a Fresnel lens sheet and a lenticular lens sheet, wherein a dye or a pigment is mixed into the lenticular lens sheet which thereby has a waveform selection transmittance, wherein the transmittance of the rear projection screen is equal to or more than 65% when the wavelength of the incident light is less than 490 nm, wherein the transmittance of the rear projection screen is equal to or less than 60% when the wavelength of the incident light is within a range from 490 nm to 660 nm, and wherein the transmittance of the rear projection screen corresponding to the incident light, the wavelength of which is within a range from 490 nm to 580 nm, is substantially different from the transmittance corresponding to the incident light, the wavelength of which is within a range from 580 nm to 660 nm.

2. A projection television having a rear projection screen including a Fresnel lens sheet and a lenticular lens sheet, wherein a dye or a pigment is mixed into the lenticular lens sheet which thereby has a waveform selection transmittance, wherein the transmittance of the rear projection screen is equal to or more than 65% when the wavelength of the incident light is less than 490 nm, wherein the transmittance of the rear projection screen is equal to or less than 60% when the wavelength of the incident light is within a range from 490 nm to 660 nm, and wherein the transmittance of the rear projection screen corresponding to the incident light, the wavelength of which is within a range from 490 nm to 580 nm, is larger than the transmittance corresponding to the incident light, the wavelength of which is within a range from 580 nm to 660 nm.

3. A projection television having a rear projection screen including a Fresnel lens sheet and a lenticular lens sheet, wherein a dye or a pigment is mixed into the lenticular lens sheet which thereby has a waveform selection transmittance, wherein the transmittance of the rear projection screen is equal to or more than 65% when the wavelength of the incident light is less than 490 nm, wherein the transmittance of the rear projection screen is equal to or less than 60% when the wavelength of the incident light is within a range from 490 nm to 660 nm, and wherein the transmittance of the rear projection screen corresponding to the incident light, the wavelength of which is within a range from 490 nm to 580 nm, is smaller than the transmittance corresponding to the incident light, the wavelength of which is within a range from 580 nm to 660 nm.

4. A projection television having a rear projection screen including a Fresnel lens sheet, a lenticular lens sheet and a smoke sheet, wherein a dye or a pigment is mixed into the smoke sheet which thereby has a waveform selection transmittance, wherein the transmittance of the rear projection screen is equal to or more than 65% when the wavelength of the incident light is less than 490 nm, wherein the transmittance of the rear projection screen is equal to or less than 60% when the wavelength of the incident light is within a range from 490 nm to 660 nm, and wherein the transmittance of the rear projection screen corresponding to the incident light, the wavelength of which is within a range from 490 nm to 580 nm, is smaller than the transmittance corresponding to the incident light, the wavelength of which is within a range from 580 nm to 660 nm.

5. A projection television having a rear projection screen including a Fresnel lens sheet, a lenticular lens sheet and a smoke sheet, wherein a dye or a pigment is mixed into the smoke sheet which thereby has a waveform selection transmittance, wherein the transmittance of the rear projection screen is equal to or more than 65% when the wavelength of the incident light is less than 490 nm, wherein the transmittance of the rear projection screen is equal to or less than 60% when the wavelength of the incident light is within a range from 490 nm to 660 nm, and wherein the transmittance of the rear projection screen corresponding to the incident light, the wavelength of which is within a range from 490 nm to 580 nm, is larger than the transmittance corresponding to the incident light, the wavelength of which is within a range from 580 nm to 660 nm.

* * * * *